H. HESS.
BALL BEARING.
APPLICATION FILED MAY 25, 1908.
1,023,017.
Patented Apr. 9, 1912.
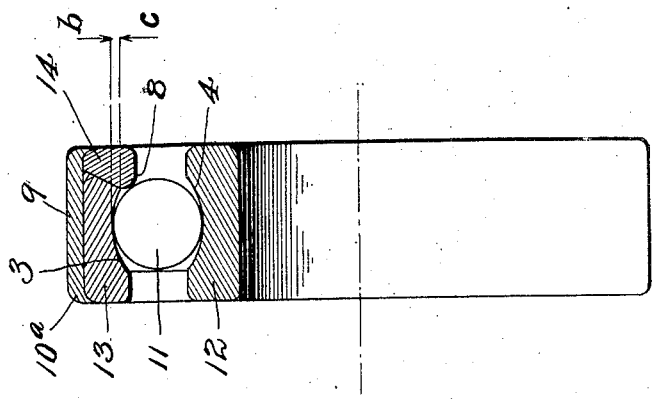
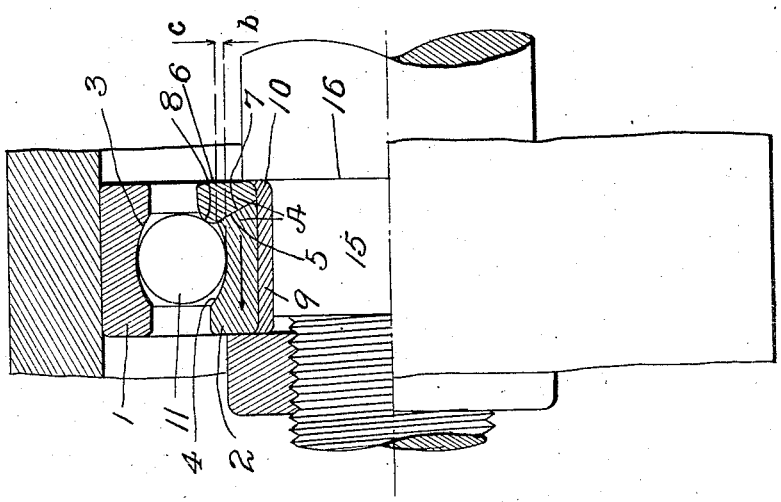
WITNESSES
Chas. K. Davies
E. L. Corbett
INVENTOR
Henry Hess
by Brock, Becker & Smith
Attorney

UNITED STATES PATENT OFFICE.

HENRY HESS, OF PHILADELPHIA, PENNSYLVANIA, ASSIGNOR TO THE HESS-BRIGHT MANUFACTURING COMPANY, OF PHILADELPHIA, PENNSYLVANIA, A CORPORATION OF DELAWARE.

BALL-BEARING.

1,023,017.  Specification of Letters Patent.  Patented Apr. 9, 1912.

Application filed May 25, 1908. Serial No. 434,862.

*To all whom it may concern:*

Be it known that I, HENRY HESS, a citizen of the United States, and resident of the city of Philadelphia, in the county of Philadelphia and State of Pennsylvania, have invented certain new and useful Improvements in Ball-Bearings, of which the following is a specification.

My invention relates to unit assembled ball bearings in which one of the rings is cut away at one side of its race and the balls are inserted in the races by forcing and when in position are prevented from displacement by the shape of the races themselves except when considerable force is exerted which might be sufficient to displace the balls from the race on the cut side. To prevent this occurrence, a retaining ring is employed which is secured against the cut bearing ring and has a surface adapted to engage the balls and prevent them from displacement from the race and also from contact with the race edge. It has previously been suggested that the retaining ring might be held to its bearing ring by a nut engaging the bearing ring or by devices constituting a part of or coacting with the bearing mounting. I provide means for permanently securing the retaining ring in position in relation to its bearing ring so that when the bearing is once assembled it is in effect a single unit containing no part which may be removed without practically destroying the bearing. This means consists, in an approved form of construction, of a thimble or sleeve engaging the bore or periphery of the bearing ring and retaining ring, depending on whether the two-part ring is the inner or the outer member of the bearing.

I will now describe in detail exemplifying structures embodying the invention which are the best I have up to the present time devised. It is to be understood that wide variations in structure may be made within the spirit of the invention.

In the drawing—Figure 1 is a longitudinal section of one-half of a ball bearing embodying the invention, in which the inner ring consists of two parts, and Fig. 2 is a similar section of a bearing in which the outer ring is divided.

Referring first to Fig. 1, reference numeral 1 designates an outer bearing ring, and 2 the principal portion of an inner bearing ring. The rings are provided, respectively, with ball races 3, 4 of curved cross-section. Balls 11 run in the races. The inner ring 2 is cut away at one side so that the diameter of the race, as indicated by the horizontal line $c$, is somewhat greater than the diameter of the ball tread indicated by $b$. This difference in diameter is more or less exaggerated in the drawing to make the feature readily apparent. A number of balls may be easily inserted in the races but when the bearing is approximately full the remaining balls are forced in over the cut edge of the inner race. Or the balls may be all placed in the outer race and the inner race then forced into position in relation to all the balls at once, with the cut-away side foremost. When the balls are forced into position in the races the bearing rings are more or less deformed but assume their normal shapes and position after the balls are in the races. When the balls are in position in the races accidental disassembly under ordinary conditions is prevented by the cut away edge of the races which is larger in diameter than the ball tread. Any considerable force, however, tending to move the inner ring in the direction of the arrow in relation to the outer ring might cause displacement of the ring or balls or might cause the balls to come in contact with the cut edge of the race. This disassembly or contact is prevented by a retaining ring 6 secured against the inner bearing ring. The bearing ring and retaining ring are usually provided with complemental conical faces 5, 7, to insure a proper fit, but the exact nature of the engaging surfaces of the rings is not essential. The retaining ring is provided with a surface 8 adapted to engage the balls. This surface may be variously shaped but is in some cases preferably convex in cross-section, as shown. Any force which tends to move the inner ring in the direction shown by the arrow is resisted by engagement of surface 8 with the balls and they are thus prevented from displacement or injurious contact with any part of the bearing. The inner bearing ring and the retaining ring 6 in a sense form a single inner ring consisting of two parts and this two-part ring is designated by the character A. Within the bore of the inner ring A is secured a thimble or sleeve 9, the ends of which at 10 are bent outwardly to engage the edges or ends of the members of the ring and hold them rigidly and permanently together. This locking sleeve 9 may be of any suitable material, usually metal of a tenacious character, and it may be secured in position and made to engage the bearing ring and retaining ring in any suitable way. The means for securing the sleeve in position does not form a part of this invention.

The outer ring instead of the inner may be divided and such a construction is shown in Fig. 2. 13 is the outer bearing ring, 14 the retaining ring, and 12 the inner bearing ring. The locking sleeve 9 is substantially the same as in Fig. 1 except that it is placed on the outer face of the outer two-part ring and its ends 10ª are turned in to engage the edges of rings 13, 14.

In some cases, thrust which urges the balls against the retaining ring with considerable force might cause displacement of the ring since it may not be possible in all cases to make sleeve 9 of sufficient strength to hold the retaining ring in position. When displacement of the ring from thrust is liable to occur, therefore, the bearing mounting is adapted to prevent this occurrence. As shown in Fig. 1, the inner ring is carried on a shaft 15 provided with a shoulder 16 against which retaining ring 6 rests. Any thrust now exerted which tends to move the inner ring 2 in the direction of the arrow brings the balls in contact with surface 8 of the retaining ring and this effort is in turn communicated by the retaining ring to shoulder 16 without bringing any effort to bear upon sleeve 9 or its outwardly turned portion 10. This arrangement may evidently be easily adapted to ball bearings in which the outer ring is divided, as shown in Fig. 2.

The sleeve 9 is only representative of means by which the parts of the two-part bearing ring may be secured together. Any other suitable means by which the members may be permanently and securely fastened together may be substituted.

I claim:

1. In a ball bearing, the combination of two bearing rings radially opposite, each ring being provided with a race of curved cross section, a series of balls in the races, one of the rings being cut away at one side to a depth slightly less than the adjacent ball tread to permit assembly by forcing, a retaining ring applied to the cut bearing ring and constructed and arranged to prevent the balls from coming in contact with the cut portion of said ring, means for retaining said locking ring permanently against said bearing ring, a shouldered support for said bearing ring and retaining ring, and a nut for clamping said rings against said shoulder.

2. The combination of two bearing rings provided with radially opposite races of curved-cross section, balls in the races, one of the races being cut away at one side to a depth less than the tread of the race, forming a lip, a retaining ring applied to the cut race and having a surface adapted to engage the balls and prevent their contact with the cut edge of the race and a locking sleeve permanently securing the bearing ring and retaining ring together.

HENRY HESS.

Witnesses:
C. H. McCalla,
J. J. Quinn.